(12) United States Patent
Ishibashi

(10) Patent No.: US 6,782,476 B1
(45) Date of Patent: Aug. 24, 2004

(54) DATA PROCESSING APPARATUS AND AUTHENTICATION METHOD APPLIED TO THE APPARATUS

(75) Inventor: Yasuhiro Ishibashi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/333,680

(22) Filed: Jun. 16, 1999

(30) Foreign Application Priority Data

Jun. 16, 1998 (JP) .......................................... 10-169042

(51) Int. Cl.[7] .............................................. H04L 9/100
(52) U.S. Cl. ...................... 713/169; 713/170; 713/151; 713/160
(58) Field of Search ............................... 713/169, 170, 713/151, 160

(56) References Cited

U.S. PATENT DOCUMENTS 5,948,136 A * 9/1999 Smyers ........................ 710/107

6,223,285 B1 * 4/2001 Komuro et al. ............. 713/160

OTHER PUBLICATIONS

IBM Technical Disclosure Bulletin, Title "Direct Memory Access Protection for IEEE 1394 Link Layer Adapters" □□Dec. 1994, vol. 37, issue 12.*

* cited by examiner

Primary Examiner—Gilberto Barrón
Assistant Examiner—Grigory Gurshman
(74) Attorney, Agent, or Firm—Finnegan, Henderson, Farabow, Garrett & Dunner, L.L.P.

(57) ABSTRACT

A CPU module, satellite or digital TV tuner, MPEG2 decoder, and DVD-RAM drives have authenticators for making device authentication, key exchange, and the like. These authenticators hold authentication data (authentication formats) of the corresponding function modules. By exchanging the authentication formats between devices which are to authenticate each other, authentication can be done in units of function modules.

17 Claims, 5 Drawing Sheets

DATA PROCESSING APPARATUS AND AUTHENTICATION METHOD APPLIED TO THE APPARATUS

BACKGROUND OF THE INVENTION

This application is based on Japanese Patent Application No. 10-169042, filed Jun. 16, 1998, the contents of which are incorporated herein by reference.

The present invention relates to a data processing apparatus such as a personal computer or the like, and an authentication method applied to the apparatus and, more particularly, to a data processing apparatus which exchanges digital contents via an interface for an external bus such as an IEEE1394 serial bus, and an authentication method for exchanging digital contents.

In recent years, along with advance of the computer technology, various kinds of multimedia compatible electronic devices such as digital video players, set-top boxes, TVs, personal computers, and the like have been developed.

Such electronic device can play back digital contents such as a movie stored in a DVD (Digital Versatile Disk), a TV program transmitted by a digital satellite broadcast, and the like.

Digital contents are normally encoded by moving image high-efficiency coding called MPEG2, and are then sent to homes via recording media or transmission media. MPEG2 coding is based on the principle of variable rate coding to assure both high image quality and a short recording time in relation to the capacity. The volume of data encoded by variable rate coding depends on the image quality of a source image, and increases as the scene includes faster motions. Hence, digital contents can provide a video with image quality as high as an original video.

Recently, in view of protection of the copyrights of such digital contents, the need for copy protection techniques for preventing their illicit copies has been advocated, but no effective schemes have been configured yet.

For this reason, a new copy protection scheme designed for an IEEE1394 serial bus as the next-generation bus interface suitable for multimedia data transmission must be examined.

The IEEE1394 serial bus is the next-generation bus interface, which connects a digital video player, set-top box, TV, personal computer, and the like, and supports two different transfer modes, i.e., an asynchronous subaction and isochronous subaction. The former mode is used upon transferring normal data that does not require real-time processing. The latter mode guarantees a broad transfer band, and is used upon transferring digital contents represented by video data and audio data in real time.

As an IEEE1394 copy protection technique, digital contents which are exchanged among devices such as a digital video player, set-top box, TV, personal computer, and the like via the IEEE1394 serial buses may be enciphered or encrypted using known enciphering techniques such as a public key system, common key system, and the like so as to prevent their illicit copies.

However, since a personal computer is by nature an open system, satisfactory protection against illicit copies cannot be expected by merely enciphering data that flow on the IEEE1394 serial bus.

More specifically, if an enciphering/deciphering function is provided to a 1394 bridge in a personal computer, the open architecture of a PCI bus can be maintained, but deciphered data (plain contents) flow on the PCI bus and can be easily copied.

In a personal computer which has an enciphering/deciphering function in the 1394 bridge, limitations of the types of contents (copy once, copy never, and copy freely) that function modules can deal with can hardly be controlled in units of function modules. For example, an MPEG2 decoder must deal with all the types of contents (copy once, copy never, and copy freely), while the types of contents that a storage device such as a DVD-RAM, HDD, or the like can deal with must be limited to copy once and copy freely contents. However, once plain contents flow on the PCI bus, it is difficult to limit the types of contents that function modules can deal with in units of function modules. This is because such limitation of contents is normally imposed by authentication among devices. More specifically, when an enciphering/deciphering function is provided to the 1394 bridge, the personal computer is also considered as one of devices on the IEEE1394 serial bus. For this reason, it is possible to limit the types of contents that the personal computer can deal with by authentication between the personal computer and another device on the IEEE1394 serial bus, but is impossible to limit the types of contents in units of individual modules in the personal computer.

In general, devices on the IEEE1394 serial bus are identified by node IDs assigned to them. For this reason, the devices communicate with each other via the IEEE1394 serial bus by specifying each other's devices using the node IDs.

The personal computer itself is one device on the IEEE1394 serial bus. Hence, in a system that specifies a communication partner by only the node ID, a device such as a digital video camera (DVC), set-top box (STB), or the like can specify the personal computer itself as a communication partner using the node ID of the personal computer, but cannot specify individual modules in the personal computer as a communication partner. For this reason, authentication between the personal computer and other devices on the IEEE1394 serial bus can be done, but cannot be done in units of individual modules of the personal computer.

BRIEF SUMMARY OF THE INVENTION

It is an object of the present invention to provide a data processing apparatus which can authenticate in units of function modules that construct a data processing apparatus such as a personal computer, and can efficiently copy-protect digital contents, and an authentication method applied to the apparatus.

In order to achieve the above object, according to the present invention, a data processing apparatus having an interface for an external bus which is capable of connecting an external device having an authentication function for exchanging data to be copy-protected, comprises an internal bus, a plurality of function modules which are coupled to the internal bus and transmit or receive data to be copy-protected via the internal bus, each of the function modules holding authentication data required for proving authenticity of that function module with respect to the function module or the external device with which the function module wants to exchange the data to be copy-protected, and authentication means for performing authentication in which two out of the plurality of function modules or one function module and the external device authenticate each other to confirm if they are authentic devices that can deal with the data to be copy-protected, by exchanging the authentication data corresponding to the devices therebetween.

In this data processing apparatus, authentication data required for authentication is held in units of a plurality of function modules that deal with data to be copy-protected such as digital contents or the like, and authentication can be done using the authentication data in units of function modules, e.g., between two function modules or between a given function module and external device. In this way, since authentication is done in units of function modules, whether or not a function module of interest is an authentic device having a copy protection function can be confirmed in units of function modules, and the types (copy once, copy never, and copy freely) of digital contents that the function module can deal with can be determined.

Also, the authentication data held in each of the function modules contains device identification data for specifying the function module, and the authentication means uses each other's device identification data as addresses for specifying devices that are to authenticate each other, so as to exchange the authentication data corresponding to the devices with a destination function module or the external device. In this manner, each module in the data processing apparatus can be specified as a device which authenticates an external device and which is authenticated by the external device.

In this case, when a protocol that uses the node IDs assigned to the data processing apparatus and external device as destination addresses is used in a communication between the data processing apparatus and external device, the device identification data is preferably used as a sub-address for specifying a function module in the data processing apparatus as a device which authenticates the external device and which is authenticated by the external device by embedding the device identification data in a given field of a data area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of the present invention will be described hereinafter with reference to the accompanying drawings.

Figure 1:
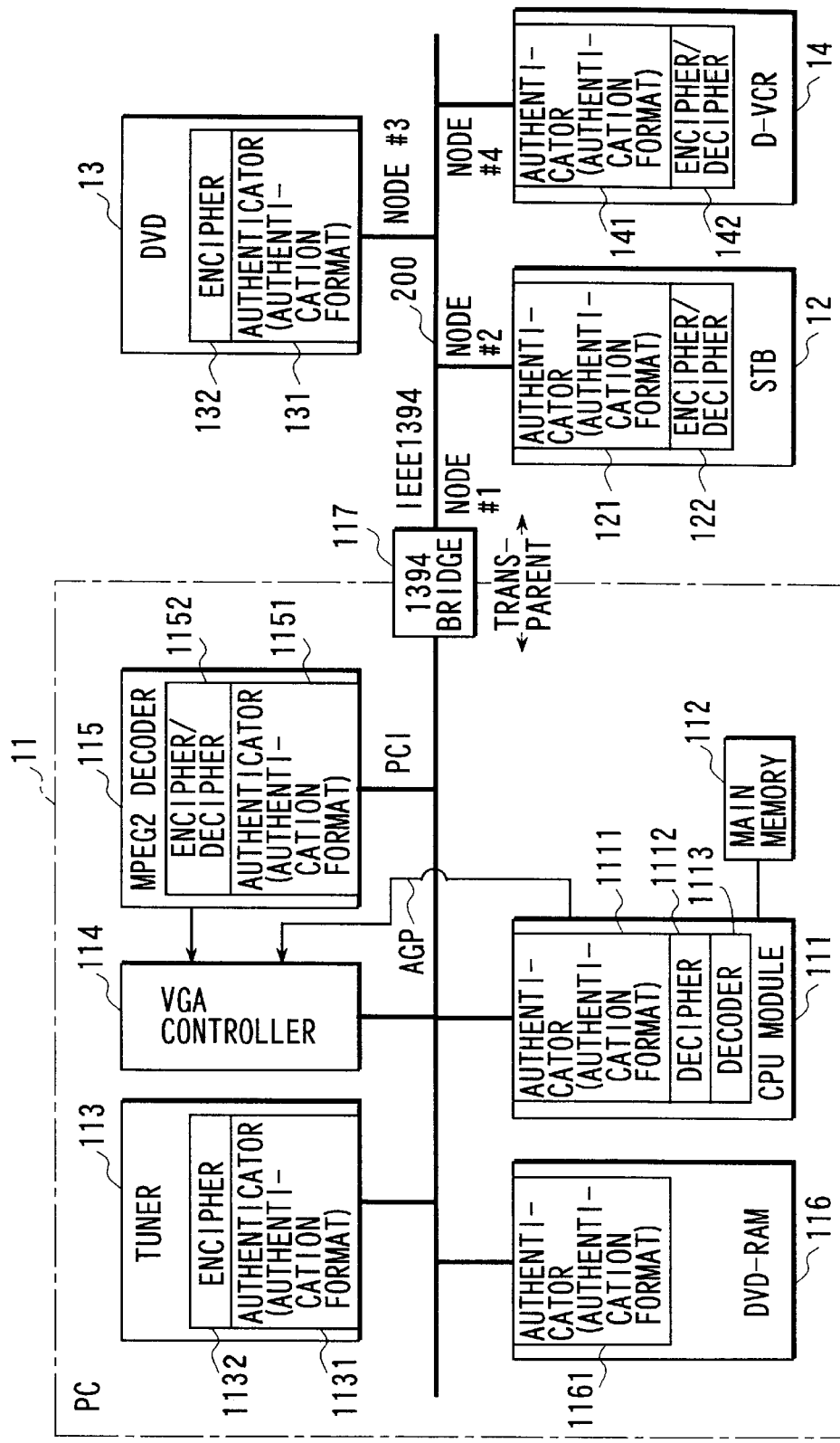
FIG. 1 is a block diagram showing the system arrangement of a computer system according to an embodiment of the present invention.

FIG. 1 shows the system arrangement of a personal computer (to be abbreviated as a PC hereinafter) according to an embodiment of the present invention. The PC 11 can communicate with external consumer electronic devices such as a set-top box (STB) 12, a digital video camera or DV camcorder (DVC) 13, and a digital video cassette recorder (D-VCR) 14 via an IEEE1394 serial bus 200, as shown in FIG. 1.

The set-top box (STB) 12, digital video camera (DVC) 13, and digital video cassette recorder (D-VCR) 14 respectively have authenticators 121, 131, and 141 in their interfaces with the IEEE1394 serial bus 200. The set-top box (STB) 12 and digital video cassette recorder (D-VCR) 14, which exchange digital contents, respectively have encipher/decipher units 122 and 142 having both enciphering and deciphering functions. On the other hand, the digital video camera (DVC) 13 which only transmits digital contents has a decipher unit 132 alone.

Digital contents to be exchanged among the PC 11, set-top box (STB) 12, digital video camera (DVC) 13, and digital video cassette recorder (D-VCR) 14 are transferred on the IEEE1394 serial bus 200 as enciphered data.

As shown in FIG. 1, the PC 11 is constructed by a PCI bus 100, and a plurality of function modules connected thereto. Among these function modules, those which deal with digital contents, i.e., a CPU module 111, satellite or digital TV tuner 113, MPEG2 decoder 115, and DVD-RAM drive 116, respectively have authenticators 1111, 1131, 1151, and 1161 for authenticating devices and exchanging keys in their interfaces with the PCI bus 100. The functions of these authenticators 1111, 1131, 1151, and 1161 are basically the same as those of the set-top box (STB) 12, digital video camera (DVC) 13, and digital video cassette recorder (D-VCR) 14 that are 1394 devices, and perform authentication and key exchange required for enciphering and exchanging digital contents.

Each of the authenticators 1111, 1131, 1151, and 1161 holds authentication data (authentication format) of a corresponding function module. This authentication format is used for proving the authenticity of that function module with respect to a destination function module or external device with which data to be copy-protected is exchanged, and is a kind of electronic signature. By exchanging the authentication formats of each other's devices between devices which authenticate each other, authentication for confirming if both the devices are authentic ones that can deal with the data to be copy-protected can be done in units of function modules.

This authentication format contains data for confirming the authenticity of a corresponding function module, and for specifying the types (copy never, copy once, copy freely) of data that the function module can deal with. The authentication format is embedded in a circuit, firmware, or the like of each function module in the PC 11.

Also, the authenticators 121, 131, and 141 of the set-top box (STB) 12, digital video camera (DVC) 13, and digital video cassette recorder (D-VCR) 14 respectively hold authentication formats of the corresponding devices.

The interfaces of these CPU module 111, tuner 113, and MPEG2 decoder 115 also have one or both a decipher unit for deciphering enciphered contents or an encipher unit. Whether each module has one or both the encipher and decipher units is determined depending on the functions of the function modules. In this embodiment, the tuner 113 has an encipher unit 1132, and the CPU module 111 and MPEG2 decoder 115 respectively have decipher units 1112 and 1152.

The CPU module 111 is made up of a microprocessor, memory controller, PCI bus bridge, and the like, and can incorporate the authenticator 1111 and decipher unit 1112 as part of, e.g., the PCI bus bridge. The authenticator 1111, decipher unit 1112, and MPEG2 decoder 1113 in the CPU module 111 may be implemented by software.

The DVD-RAM drive 116 is provided as an auxiliary storage device of the PC 11, and is connected to the PCI bus 100 via an IDE interface, ATAPI interface, or the like. The DVD-RAM drive 116 has the authenticator 1161 alone, but has neither a decipher unit nor encipher unit. This is because enciphered digital contents are recorded on a DVD-RAM in the DVD-RAM drive 116 as enciphered data.

The PC 11 also has a 1394 bridge 117 which connects the PCI bus 100 and IEEE1394 serial bus 200 in two ways. The 1394 bridge 117 includes none of an authenticator, and encipher and decipher units, and enciphered digital contents are transferred from the PCI bus 100 to the IEEE1394 serial bus 200 or vice versa as enciphered data. In this manner, the 1394 bridge 117 transparently connects the function modules in the PC 11 and the 1394 devices.

The processing sequence upon inputting digital contents such as a TV program or the like by digital satellite broadcast from the STB 12 to the PC 11 via the IEEE1394 serial bus 200 and decoding the input contents by the MPEG2 decoder 115 will be explained below.

The STB 12 and MPEG2 decoder 115 authenticate each other under the control of the CPU module 111 to see if they are authentic devices having a copy protection function. In this device authentication, each other's authentication formats are exchanged, and the types (copy never, copy once, copy freely) of data that these devices can deal with are confirmed. This authentication includes two levels, i.e., full authentication and restricted authentication, and the authentication level is determined by the types of data that devices which authenticate each other can deal with. Full authentication is used only when both devices which authenticate each other can deal with copy never data.

In this authentication, in addition to exchange of the authentication formats, verification for identifying devices on the transmitting and receiving sides of digital contents is done using a known method such as random challenge & response, a method using a one-way hash function, a method using a time variable key which changes every time using a random number, and the like.

Furthermore, in this authentication, the MPEG2 decoder 115 exchanges keys with the STB 12 under the control of the CPU module 111 and generates a key for deciphering enciphered contents.

Since the authenticator is located within the MPEG2 decoder 115, the key itself or data for generating the key is transferred as enciphered data from the STB 12 to the MPEG2 decoder 115 via the 1394 bus 200 and PCI bus 100.

Only after the STB 12 and MPEG2 decoder 115 confirm each other that they are authentic devices having a copy protection function, the STB 12 enciphers digital contents, and sends them to the MPEG2 decoder 115. The enciphered contents reach the MPEG2 decoder 115 as enciphered data via the 1394 bus 200 and PCI bus 100, and the decipher unit 1152 in the MPEG decoder 115 deciphers the enciphered contents using the key obtained by authentication. The deciphered contents are decoded by the MPEG2 decoder 115, and are supplied to a VGA controller 114 via a video bus or the like that directly connects the MPEG2 decoder 115 to the VGA controller 114. The decoded contents are then played back by the VGA controller 114.

As described above, the authenticators and encipher units and/or decipher units are prepared in the respective interfaces of the plurality of function modules that deal with digital contents, and upon exchanging digital contents to be copy-protected between function modules or between the function module and 1394 device, authentication and enciphering/deciphering of the digital contents are done between these devices. In this way, deciphering keys and digital contents are transferred on both the IEEE1394 bus 200 and PCI bus 100 as enciphered data, thus preventing illicit copies of the digital contents.

Since authentication can be done between two devices in units of function modules in the PC 11 using the corresponding authentication formats, the types (copy once, copy never, and copy freely) of digital contents that each function module can deal with can be limited in units of function modules. For example, the MPEG2 decoder 115 can deal with all the types of contents (copy once, copy never, and copy freely), and the DVD-RAM drive 116 can deal with only copy once contents and copy freely contents.

Figure 2:
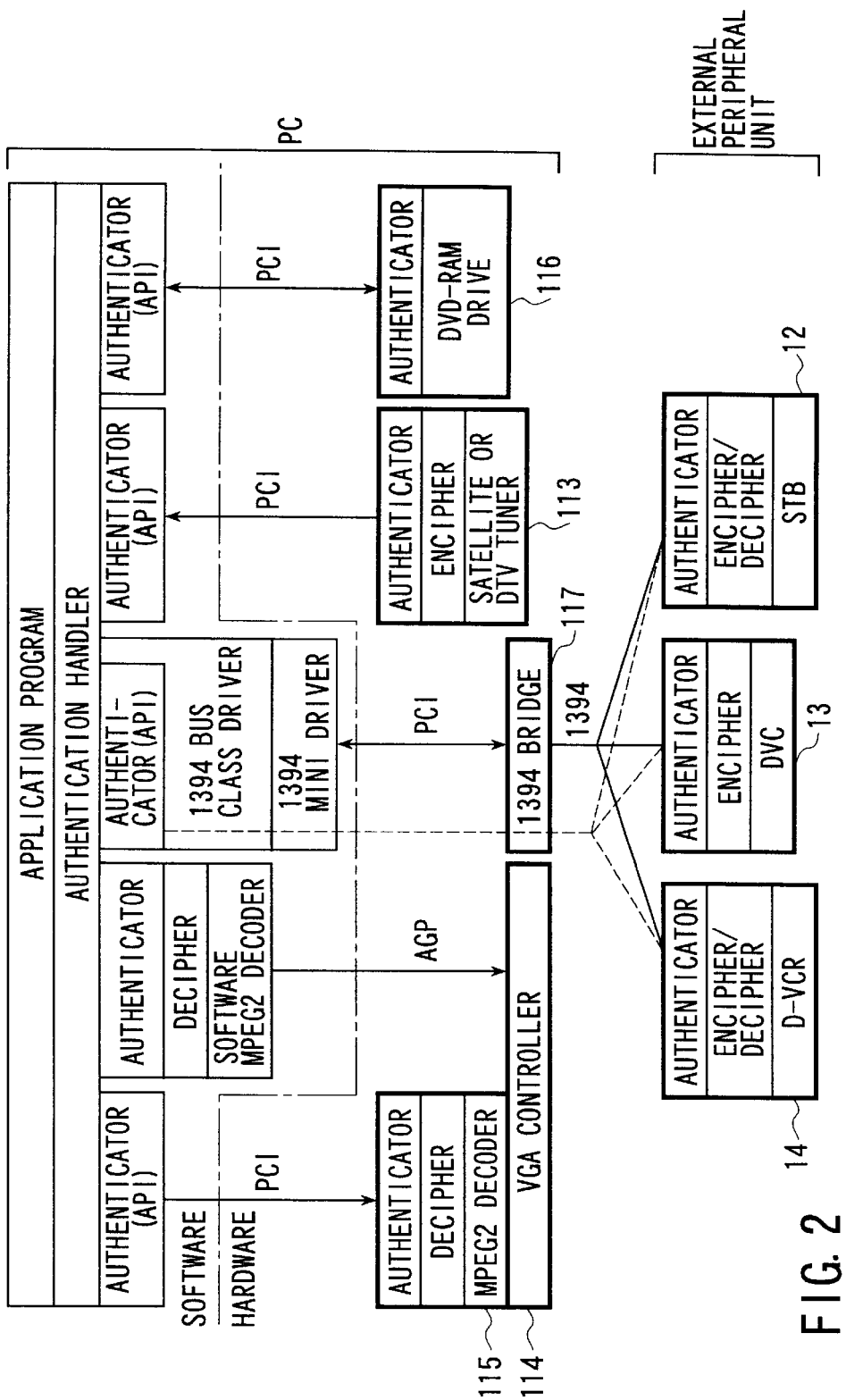
FIG. 2 is a diagram showing the relationship between software and hardware components in the system shown in FIG. 1.

FIG. 2 shows the relationship between software and hardware components in the system shown in FIG. 1.

Referring to FIG. 2, components above the one-dashed chain line are implemented by software, and those below the line are implemented by hardware. Vertically hierarchical blocks bounded by the bold frames are hardware devices such as the function modules in the PC 11, 1394 devices, and the like.

An authenticator handler makes control for authentication and key exchange with required hardware devices in response to a request from an application program such as digital contents playback software. More specifically, under the control of the authenticator handler, authentication data are exchanged between two function modules or between the function module and external device, thus authenticating to confirm if they are authentic devices that can deal with the data to be copy-protected.

As described above, since the 1394 bridge 117 transparently connects the individual function modules in the PC 11 and 1394 devices, the application program can equally handle the function modules in the PC 11 and 1394 devices without distinguishing them from each other, as indicated by the dotted lines, by installing the authentication and enciphering/deciphering protocols in the function modules in the PC 11 as in the 1394 devices.

Figure 3:
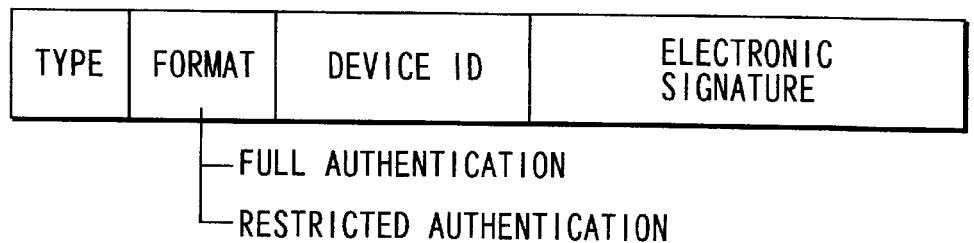
FIG. 3 shows an example of an authentication format prepared in units of function modules in the personal computer shown in FIG. 1.

FIG. 3 shows an example of the authentication format held in units of function modules in the PC 11. The authentication format is managed by a predetermined management institution (entity) such as a bureau of authentication. The entity gives, to only a device that has been confirmed to have an authentic copy protection function, an authentication format which contains a device ID and the like for proving such authenticity.

As shown in FIG. 3, the authentication format is made up of type data, format data, a device ID, and an electronic signature.

1) Type Data

The type data indicates that this data sequence is authentication data.

2) Format Data

The format data indicates which of two authentication levels, i.e., full authentication that can deal with all the types of contents including copy never contents, and restricted authentication that can deal with only copy free or copy once contents, the device of interest corresponds to. For example, a device corresponding to full authentication is embedded with a public key corresponding to a public key system, and a device corresponding to restricted authentication is embedded with a common key corresponding to a common key system.

3) Device ID

The device ID is identification data for specifying the device of interest from other devices, and indicates that the device of interest is an authentic one managed by the entity. In addition, the device ID includes various data such as the manufacturer name, device name, and the like. As this device ID, an identical value is assigned to an identical model of devices manufactured by a given manufacturer.

4) Electronic Signature

The electronic signature guarantees that the authentication format has not been altered.

Since such authentication formats are exchanged between two function modules or between a function module and a 1394 device to confirm if each other's formats are authentic ones free from any alteration or each other's device IDs are authentic ones registered in the entity, whether or not the two devices have authentic copy protection functions can be confirmed in units of function modules. Also, the type of copy protection function (copy once, copy never, copy freely) can be determined in units of function modules.

A protocol used in a communication between each function module in the PC and external device (1394 device) will be explained below.

An interdevice communication via the IEEE1394 serial bus 200 is implemented using the node IDs assigned in units of devices, as described above. For example, as shown in FIG. 1, the node IDs are assigned in units of devices: node #1 to the PC 11, node #2 to the STB 12, node #3 to the DVC 13, node #4 to the D-VCR 14, and so forth. Each of the PC 11, STB 12, DVC 13, and D-VCR 14 specifies a communication partner using its node ID.

Figure 4:
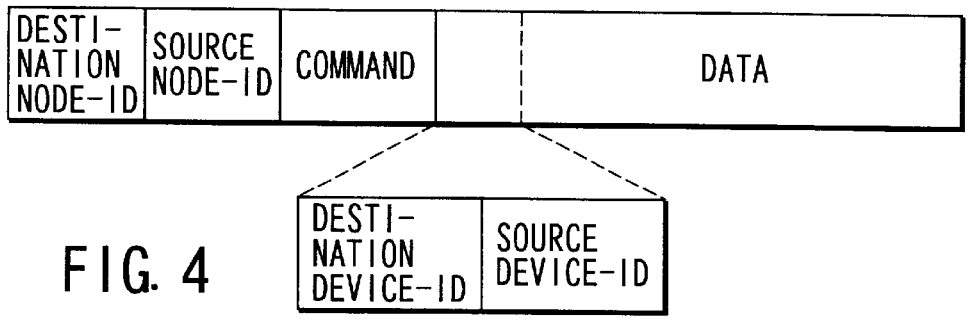
FIG. 4 shows an example of a data format used in a communication between each function module in the personal computer shown in FIG. 1 and an external device (1394 device)

An AV/C protocol defined by the IEEE1394 standards can be used in communications made among the PC 11, STB 12, DVC 13, and D-VCR 14 via the IEEE1394 serial bus 200. FIG. 4 shows an example of the data transfer format complying with the AV/C protocol.

As shown in FIG. 4, the data transfer format complying with the AV/C protocol is made up of a destination node ID field (Destination Node-ID), source node ID field (Source Node-ID), command field, and data field (Data). The destination node ID field designates the node ID of a data destination device as an address, and data transmitted onto the IEEE1394 serial bus 200 is received by a device having a node ID designated by the destination node ID field.

In this embodiment, the above-mentioned device IDs are used as sub-addresses to allow authentication between each function module in the PC 11 and each device on the IEEE1394 serial bus 200.

More specifically, in authentication, specific sub-fields in Data such as head sub-fields of the data field (Data) are used as areas for designating a sub-address (Destination Device-ID) for designating a destination device, and a sub-address (Source Device-ID) for designating a source device. As these Destination Device-ID and Source Device-ID, the device IDs in the authentication formats described above with reference to FIG. 3 are used. Since the respective function modules in the PC 11 hold the authentication formats, each of the function modules in the PC can be specified as a device which authenticates each of the STB 12, DVC 13, and D-VCR 14 and which is authenticated by each device, using the device ID in the authentication format.

In this embodiment, a combination of a node ID and device ID is used as an address for specifying each function module in the PC, so that the PC is specified by the node ID, and each function module in the PC is specified by the device ID.

Figure 5:
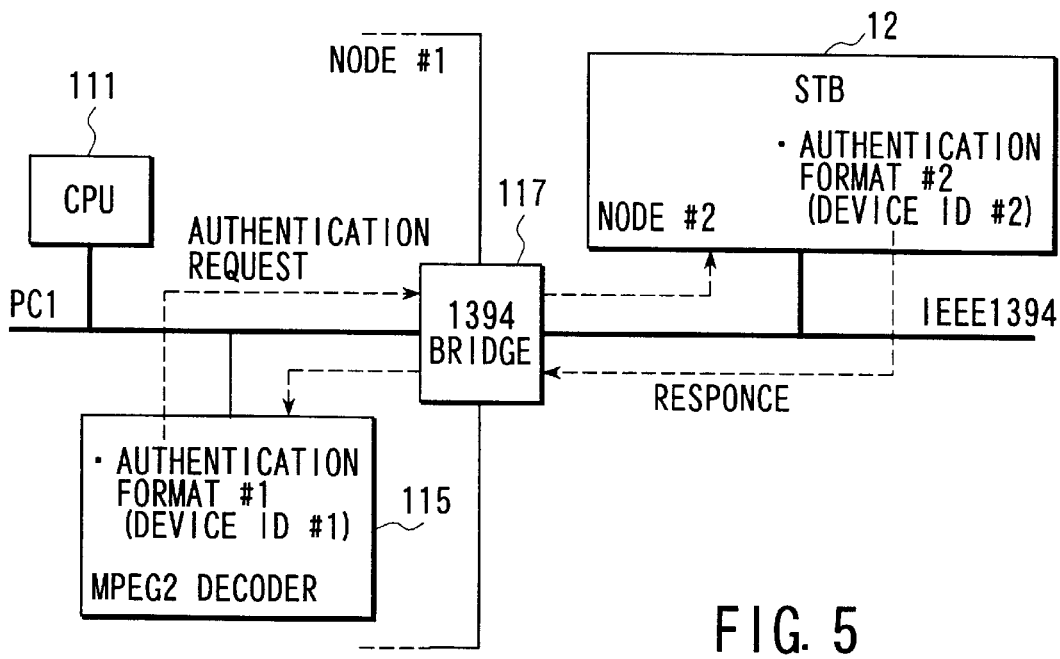
FIG. 5 is a diagram showing the authentication procedure between an MPEG2 decoder in the personal computer and a set-top box on an IEEE1394 serial bus.

The authentication procedure between each function module in the PC 11 and the STB 12, DVC 13, or D-VCR 14 will be explained below with reference to FIG. 5.

In this case, authentication between the MPEG2 decoder 115 in the PC 11 and the STB 12 on the IEEE1394 serial bus 200 will be exemplified.

1) The authenticator 1151 of the MPEG2 decoder 115 issues an authentication request to the STB 12 on the IEEE1394 serial bus 200. This request is normally issued under the control of the CPU module 111. More specifically, the CPU module 111 receives the authentication format from the MPEG2 decoder 115, and issues the following data using that format to the STB 12.

Figure 6A:
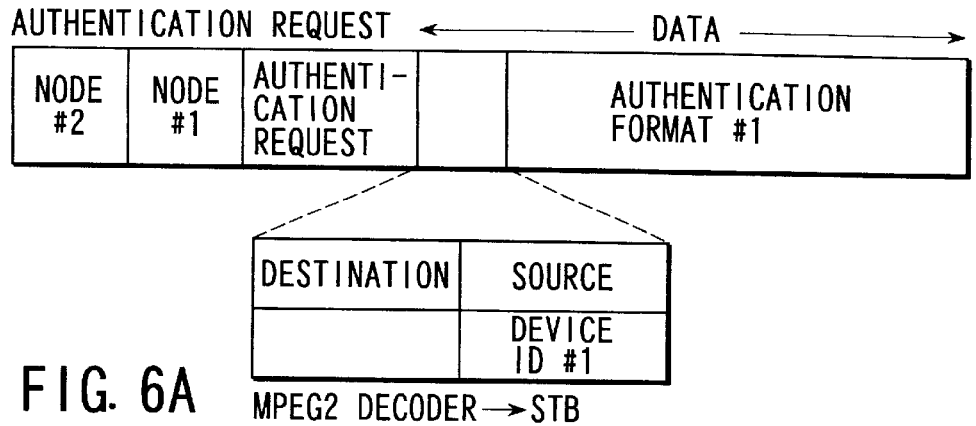
FIGS. 6A and 6B show examples of data exchanged for authentication between the MPEG2 decoder and set-top box shown in FIG. 5.

In this case, a data sequence with a format shown in FIG. 6A is output onto the IEEE1394 serial bus 200. More specifically, the Destination Node-ID field contains node #2, the Source Node-ID field contains node #1, and the command field contains an authentication request command. Furthermore, the data field contains the authentication format (authentication format #1) of the MPEG2 decoder 115. Since authentication format #1 includes the device ID (device ID #1) of the MPEG2 decoder 115, the device ID of the MPEG2 decoder 115 need not be especially designated as the source node ID field (Source Node-ID). However, as shown in FIG. 6A, the source node ID field (Source Node-ID) may be contained.

2) Upon receiving the authentication request from the MPEG2 decoder 115, the STB 12 authenticates the MPEG2 decoder 115 using the authentication format contained in the authentication request.

3) The STB 12 sends back a response to the authentication request to the MPEG2 decoder 115.

Figure 6B:
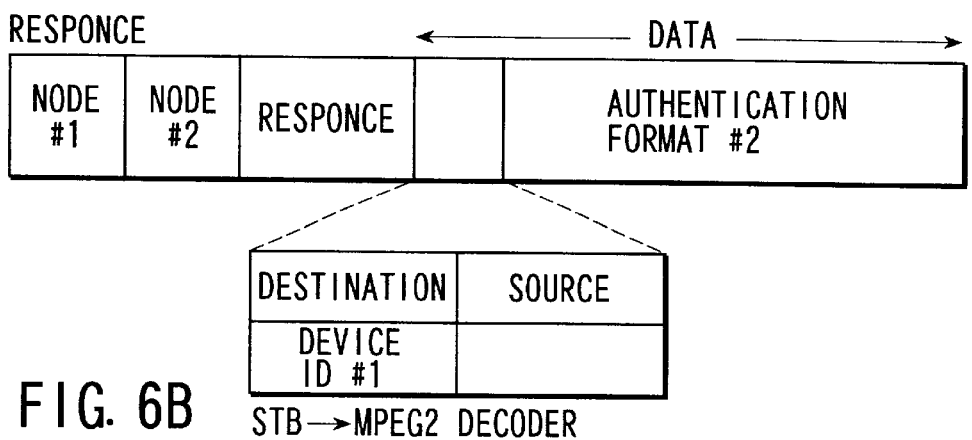

In this case, a data sequence with the format shown in FIG. 6B is output onto the IEEE1394 serial bus 200. More specifically, the Destination Node-ID field contains node #1, the Source Node-ID field contains node #2, and the command field contains a response command. Furthermore, the data field contains the device ID (device ID #1) of the MPEG2 decoder 115, and the authentication format (authentication format #2) of the STB 12.

4) This response is received by the 1394 bridge 117, and is handed-off to the CPU module 111. The CPU module 111 interprets the response, and determines based on the contents of the destination node ID field (Destination Node-ID)

that the response is addressed to the MPEG2 decoder 115. Then, the response is sent from the CPU module 111 to the MPEG2 decoder 115.

5) The authenticator 1151 of the MPEG2 decoder 115 authenticates the STB 12 using authentication format #2 handed-off from the CPU module 111.

Note that basically the function module and 1394 device, which exchange enciphered contents need only authenticate each other before they exchange enciphered contents. Also, upon initialization of the PC 11, authentication processes between all the function modules in the PC 11 and 1394 devices may be simultaneously done. In this case, every time connection of a new 1394 device is detected, the new 1394 device and all the function modules authenticate each other.

Figure 7:
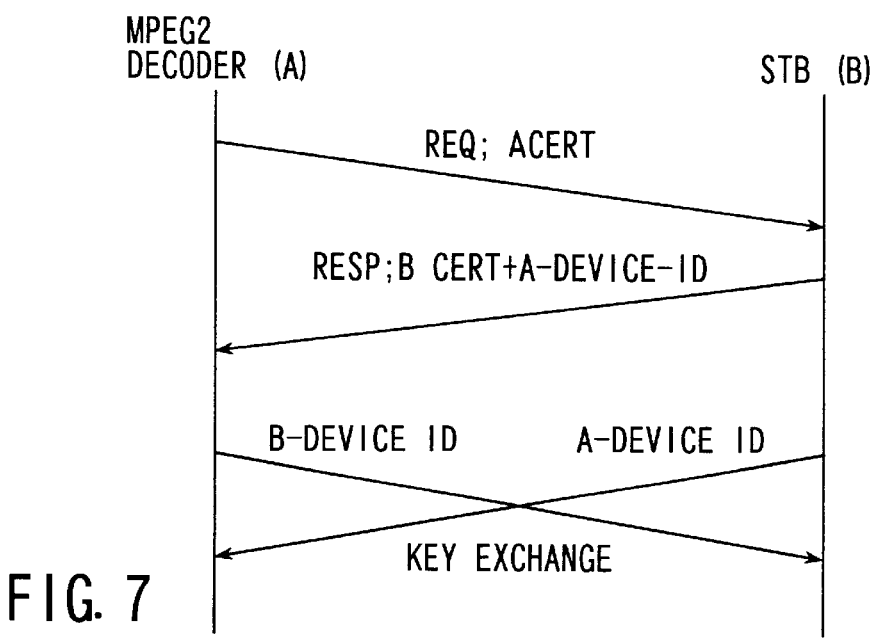
FIG. 7 is a chart showing the flow of the overall authentication between each function module in the personal computer shown in FIG. 1 and the external device (1394 device)

FIG. 7 shows the flow of the entire authentication between each function module in the PC 11 and 1394 device. In FIG. 7, the function module in the PC 11 is device A, and the 1394 device is device B.

An authentication request (Req) containing the authentication format (Acert) of device A is sent to device B. Device B then sends back a response including its authentication format (Bcert) and the device ID (A-Device ID) of device A.

By exchanging the authentication formats in this way, devices A and B authenticate each other to confirm the types of data they can deal with.

Subsequently, key exchange is done. In this key exchange as well, the device ID of device B is transmitted upon transmitting a key from device A to device B; the device ID of device A is transmitted upon transmitting a key from device B to device A.

Note that the 1394 device can be specified by the node ID alone. For this reason, the device ID for designating a 1394 device need not be appended to data addressed to the 1394 device.

Also, in authentication between the function modules in the PC 11, the device IDs can be used as addresses for specifying devices which must undergo authentication process together.

Figure 8:
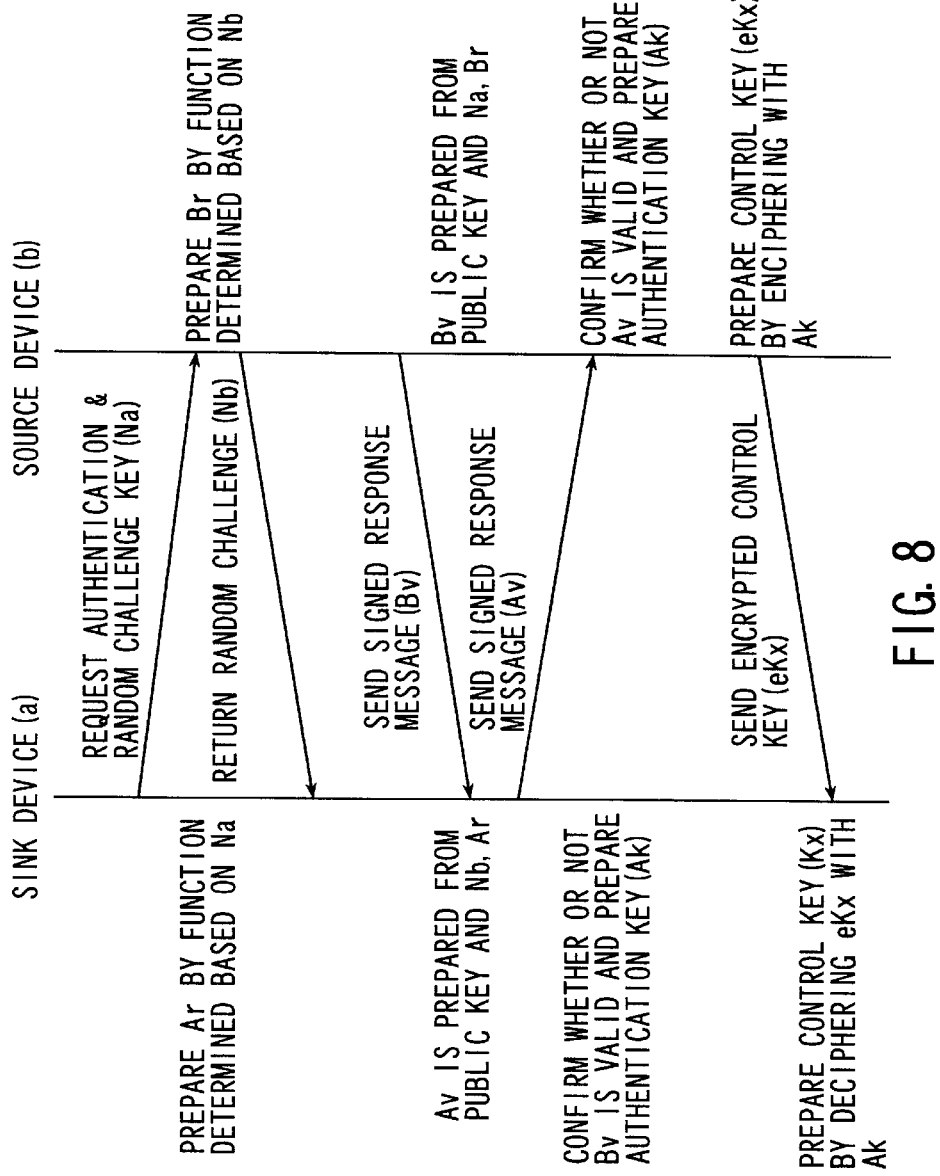
FIG. 8 is a chart showing an example of the key exchange procedure between each function module in the personal computer shown in FIG. 1 and the external device (1394 device).

This key exchange is done in the procedure shown in, e.g., FIG. 8.

In FIG. 8, a device that transmits contents is Source Device, and a device that receives the contents is Sink Device. Also, assume that Source device is a 1394 device, and Sink device is a function module in the PC 11.

Sink Device generates a random challenge key (Na), which changes every time, using a random number, and passes the random challenge key (Na) to Source Device together with an authentication request. Sink Device then generates Ar from Na using a predetermined function.

Source Device generates a random challenge key (Nb), which changes every time, using a random number, and sends back it as a response to the authentication request to Sink Device. In this case, the device ID of Sink Device is appended as a sub-address, as described above.

Source Device generates Br from Nb using a predetermined function.

After that, Source device sends a message (Bv) to Sink Device. This message (Bv) is generated based on a public key, Na, and Br. Upon transmission of this message (Bv) as well, the device ID of Sink Device is appended as a sub-address.

Sink Device sends a message (Av) to Source Device. This message (Av) is generated based on a public key, Nb, and Ar.

Source Device confirms if Av is valid. If Av is valid, Source Device determines that Sink Device is an authentic device, and generates an authentication key (Ak). Likewise, Sink Device confirms if Bv is valid. If Sink Device determines that Source Device is an authentic device, it generates an authentication key (Ak).

Source Device then sends a control key (eKx) enciphered by the authentication key (Ak) to Sink Device. In this case, the device ID of Sink Device is appended as a sub-address.

Sink Device deciphers the enciphered control key (eKx) using the authentication key (Ak) to generate a control key (Kx).

Note that the authentication process shown in FIG. 8 is merely an example, and other known methods such as conventional random challenge & response and the like may be used as long as devices can authenticate each other to confirm if they are authentic devices, as described above.

In the embodiment shown in FIG. 1, the authenticators provided in the function modules 111, 113, 115 and 116, respectively are implemented by hardware. However, the authenticators may be implemented as device drivers for the modules 111, 113, 115, and 116, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus having an interface for an external bus which is capable of connecting an external device having an authentication function for exchanging data to be copy-protected, the apparatus being assigned with node identification data, comprising:

an internal bus coupled to the interface for the external bus, wherein the interface transfers encrypted data to be copy-protected from the external bus to the internal bus;

a plurality of function modules which are coupled to said internal bus and transmit or receive data to be copy-protected via said internal bus, each of said function modules holding authentication data required for proving authenticity of that function module with respect to the function module or the external device with which the function module wants to exchange the data to be copy-protected, the authentication data comprising device identification data specifying the each of said function modules, wherein at least one of the plurality of function modules includes at least one of an encryption means and a decryption means for encrypting or decrypting data to be copy-protected; and authentication means for performing authentication in which two out of said plurality of function modules or one function module and the external device authenticate each other to confirm if they are authentic devices that can deal with the data to be copy-protected, by exchanging the authentication data and node identification data corresponding to the devices therebetween, wherein the device identification data is used as a sub-address for specifying one of the function modules in said data processing apparatus as a device which authenticates the external device and which is authenticated by the external device.

2. The apparatus according to claim 1, wherein a type of data to be copy-protected includes copy once data and copy never data, and the authentication data held in each of said function
modules contains data indicating an authentication
level which defines the type of data that the function
module can deal with.

3. The apparatus according to claim 1, wherein the function module that deals with data to be copy-protected includes at least one of a CPU module, a decoder for decoding encoded data obtained by digital compression coding, and a storage device.

4. The apparatus according to claim 1, wherein said authentication means uses each other's device identification data as addresses for specifying devices that are to authenticate each other, so as to exchange the authentication data corresponding to the devices with a destination function module or the external device.

5. The apparatus according to claim 4, wherein a communication between said data processing apparatus and the external device uses a protocol which uses the node identification data assigned to said data processing apparatus and the external device as destination addresses.

6. The apparatus according to claim 1, wherein said data processing apparatus is a personal computer having as the function module at least one of a CPU module, a decoder for decoding encoded data obtained by digital compression coding, and a storage device, and said personal computer comprises an IEEE1394 serial bus as an interface with the external bus.

7. A data processing apparatus having an interface for an external bus which is capable of connecting an external device having an authentication function for exchanging data to be copy-protected, the apparatus being assigned with node identification data, comprising:

an internal bus coupled to the interface for the external bus, wherein the interface transfers encrypted data to be copy-protected from the external bus to the internal bus;

a plurality of function modules which are coupled to said internal bus and transmit or receive data to be copy-protected via said internal bus, wherein at least one of the plurality of function modules includes at least one of an encryption means and a decryption means for encrypting or decrypting data to be copy-protected; and authentication means for performing authentication with a destination function module or the external device that exchanges the data to be copy-protected in units of function modules, said authentication means exchanging device identification data held in each of said function modules and the node identification data as an address for specifying the function module as a device which authenticates the external device and which is authenticated by the external device, when said authentication means executes authentication between the function module and external device, wherein the device identification data is used as a sub-address for specifying one of the function modules in said data processing apparatus as a device which authenticates the external device and which is authenticated by the external device.

8. The apparatus according to claim 7, wherein a communication between said data processing apparatus and the external device uses a protocol which uses the node identification data assigned to said data processing apparatus and the external device as destination addresses.

9. An authentication method applied to a data processing apparatus which comprises an internal bus, a plurality of function modules which are coupled to said internal bus and transmit or receive data to be copy-protected via said internal bus, and an interface for an external bus which is capable of connecting an external device having an authentication function for exchanging data to be copy-protected, and wherein the interface transfers encrypted data to be copy-protected from the external bus to the internal bus;

making each of said function modules hold authentication data required for proving authenticity of that function module with respect to the function module or the external device with which the function module wants to exchange the data to be copy-protected, wherein at least one of said function modules includes at least one of an encryption means and a decryption means for encrypting or decrypting data to be copy-protected; and executing authentication in which two out of said plurality of function modules or one function module and the external device authenticate each other to confirm if they are authentic devices that can deal with the data to be copy-protected, by exchanging the authentication data corresponding to the devices therebetween, the authentication data comprising node identification data assigned to the data processing apparatus and the external device and device identification data assigned to the function modules, wherein the device identification data is used as a sub-address for specifying one of the function modules in said data processing apparatus as a device which authenticates the external device and which is authenticated by the external device.

10. The method according to claim 9, wherein a type of data to be copy-protected includes copy once data and copy never data, and the authentication data held in each of said function modules contains data indicating an authentication level which defines the type of data that the function module can deal with.

11. The method according to claim 9, wherein the function module that deals with data to be copy-protected includes at least one of a CPU module, a decoder for decoding encoded data obtained by digital compression coding, and a storage device.

12. The method according to claim 9, wherein the authentication uses each other's device identification data as addresses for specifying devices that are to authenticate each other, so as to exchange the authentication data corresponding to the devices with a destination function module or the external device.

13. The method according to claim 12, wherein a communication between said data processing apparatus and the external device uses a protocol which uses the node identification data assigned to said data processing apparatus and the external device as destination addresses.

14. The method according to claim 9, wherein said data processing apparatus is a personal computer having as the function module at least one of a CPU module, a decoder for decoding encoded data obtained by digital compression coding, a and a storage device, and said personal computer comprises an IEEE1394 serial bus as an interface with the external bus.

15. An authentication method applied to a data processing apparatus which comprises an internal bus, a plurality of function modules which are coupled to said internal bus and transmit or receive data to be copy-protected via said internal bus, and an interface for an external bus which is capable of connecting an external device having an authentication function for exchanging data to be copy-protected, and wherein the interface transfers encrypted data to be copy-protected from the external bus to the internal bus without decrypting data to be copy-protected, comprising the steps of:

making each of said function modules hold device identification data for specifying the function module, wherein at least on of said function modules includes at least one of an encryption means and a decryption means for encrypting or decrypting data to be copy-protected; and executing authentication between a specific one of said function modules and the external device to confirm if they are authentic devices that can deal with the data to be copy-protected, using the device identification data held in each of said function modules and node identification data assigned to the data processing apparatus and the external device as an address for specifying the function module as a device which authenticates the external device and which is authenticated by the external device, wherein the device identification data is used as a sub-address for specifying one of the function modules in said data processing apparatus as a device which authenticates the external device and which is authenticated by the external device.

16. The method according to claim 15, wherein a communication between said data processing apparatus and the external device uses a protocol which uses the node identification data assigned to said data processing apparatus and the external device as destination addresses.

17. A data processing apparatus having an interface for an external bus which is capable of connecting an external device having an authentication function for exchanging data to be copy-protected, comprising:

an internal bus coupled to the interface for the external bus, wherein the interface transfers encrypted data to be copy-protected from the external bus to the internal bus;

a plurality of function modules which are coupled to said internal bus and transmit or receive data to be copy-protected via said internal bus, wherein at least one of the plurality of function modules includes at least one of an encryption means and a decryption means for encrypting or decrypting data to be copy-protected; and authentication means, provided in units of function modules and implemented as a device driver for the respective function modules, for performing authentication with a destination function module or the external device that exchanges the data to be copy-protected in units of function modules, said authentication means exchanging device identification data held in each of said function modules and node identification data assigned to the data processing apparatus and the external device as an address for specifying the function module as a device which authenticates the external device and which is authenticated by the external device, when said authentication means executes authentication between the function module and external device, wherein the device identification data is used as a sub-address for specifying one of the function modules in said data processing apparatus as a device which authenticates the external device and which is authenticated by the external device.

* * * * *

UNITED STATES PATENT AND TRADEMARK OFFICE
CERTIFICATE OF CORRECTION

PATENT NO. : 6,782,476 B1
DATED : August 24, 2004
INVENTOR(S) : Ishibashi

It is certified that error appears in the above-identified patent and that said Letters Patent is hereby corrected as shown below:

Column 12,
Line 7, change "bus;" to -- bus comprising the steps of: --.
Line 61, change "coding, a" to -- coding, --.

Column 13,
Line 6, delete "without decrypting data to be copy-protected".
Line 10, change "at least on" to -- at least one --.

Signed and Sealed this

Fourth Day of January, 2005

JON W. DUDAS
*Director of the United States Patent and Trademark Office*